United States Patent Office 2,836,575
Patented May 27, 1958

2,836,575

COMPOSITION COMPRISING A POLYESTER-DIISO-CYANATE REACTION PRODUCT AND AN ALKYL ACID PHOSPHATE AND PROCESS OF PREPARATION

Frederick Arthur Jones, Castle Bromwich, Wilfrid Cooper, Erdington, Birmingham, Daniel Owen Bowen, Kings Heath, Birmingham, and William Alun Griffiths, Erdington, Birmingham, England, assignors to Dunlop Rubber Company Limited, County of London, England, a British company No Drawing. Application June 21, 1955
Serial No. 517,052

Claims priority, application Great Britain June 21, 1954

15 Claims. (Cl. 260—30.6)

This invention relates to polymers reacted with polyisocyanates or polyisothiocyanates.

In the preparation of synthetic elastomers by the reaction of polyesters with polyisocyanates difficulty is experienced because of the high chemical reactivity of the isocyanates. The reaction is difficult to control and the products obtained are difficult to process, since they can be milled, extruded or shaped by moulding only for an exceedingly short time after their formation. A process of this type for obvious reasons possesses very serious limitations from a production point of view.

Our invention provides reaction products of the type described which retain their ability to mill satisfactorily, their tackiness and their good moulding characteristics for much longer periods than the compositions previously proposed.

Our invention further provides an improved method of preparing synthetic elastomers from the said reaction products.

According to our present invention a composition for the preparation of synthetic elastomers comprises a reaction product of a polymer with a polyisocyanate or polyisothiocyanate in admixture with an acid ester of a phosphorus-containing acid.

According to the invention also, a process for the preparation of synthetic elastomers comprises retarding the setting of a reaction product of a polymer with a polyisocyanate or polyisothiocyanate by incorporating therein an acid ester of a phosphorus-containing acid, subsequently neutralising the said acid ester prior to moulding and then moulding the product.

According to a preferred form of the invention an organic acid chloride is also incorporated in the reaction product.

Suitable acid esters are those which are soluble or partially soluble in the polyester/polyisocyanate or polyester/polyisothiocyanate reaction product.

The preferred acid esters are the mono- and di-alkyl esters of orthophosphoric acid. The alkyl groups in these esters preferably contain from 3 to 5 carbon atoms, e. g. the butyl group, but may contain from 2 to 18 carbon atoms.

The amount of alkyl acid phosphate required is quite small and is usually of the order of 0.1% to 1.0% of the weight of the reaction product.

The reaction products and elastomeric products of this invention are well known and may be prepared from polyethers or from polyesters including polyesteramides obtained by condensation of polybasic carboxylic acids with polyhydric alcohols, amino-alcohols and/or diamines. The polyethers, polyesters or polyesteramides are modified by reaction with organic polyisocyanates or polyisothiocyanates, e. g. organic diisocyanates, and further reacted, if so desired, with cross-linking agents such as water, polyhydric alcohols, polybasic amines or amino alcohols.

The preferred compositions are the reaction products of linear polyesters with naphthalene diisocyanates and these may be combined with cross linking agents, such as water or glycols, if deired. Also, a proportion only of the isocyanate can be combined with the polyester prior to the addition of the alkyl acid phosphate and the remainder can be added later before the phosphate is neutralised.

The addition of a small quantity of alkyl acid phosphate to a polyester-polyisocyanate reaction product results in a material which after heating to complete the reaction can be stored for a period and then can still be milled to a smooth sheet which possesses some self-adhesion or tackiness. During this milling operation the alkyl acid phosphate can be neutralized by addition of a base or basic material. Before this neutralisation is carried out, however, additional polyisocyanate may be milled in if desired. If it is desired to add additional polyisocyanate the original reaction mixture should contain a ratio of polyester to polyisocyanate from 1:1.01 up to 1:1.10 and then additional polyisocyanate may be added during the milling process but before addition of the base to bring the ratio up to between 1:1.4 and 1:1.6.

If sufficient of the alkyl acid phosphate has been added, the reaction product can be stored for several days at room temperatures and yet still mill satisfactorily at the end of this time without crumbling. It forms a smooth, tacky sheet to which the base is readily added. At this stage filling or reinforcing materials such as carbon black and silica, may be added if desired. The sheets so obtained can be moulded easily at relatively low pressures to give well-moulded products.

A particular advantage of the alkyl acid phosphates used in the present invention is that they are not decomposed by moist air. Hence the reaction product containing such an ester may be stored under conditions of normal humidity.

Examples of suitable alkyl acid phosphates are ethyl, propyl, butyl, amyl, hexyl, lauryl, palmityl and stearyl acid phosphates.

In our co-pending application Serial No. 492,792, filed March 7, 1955, there is described a composition for the preparation of synthetic elastomers which comprises a reaction product of a polyester with a polyisocyanate or polyisothiocyanate in admixture with an organic acid chloride.

The preferred acid chlorides are the acyclic carboxylic acid chlorides possessing from four to twenty carbon atoms in the acyl group.

Further, in our co-pending application Serial No. 492,792, filed March 5, 1955, the polyester/polyisocyanate or polyester/polyisothiocyanate reaction product is admixed with acid chlorides containing a cyclic hydrocarbon nucleus.

As previously mentioned in a preferred form of the present invention a reaction product of a polyester with a polyisocyanate or polyisothiocyanate is admixed with a mixture of an organic acid chloride and an acid ester of a phosphorus-containing acid.

In the process according to this preferred form a mixture of an organic acid chloride and an acid ester of a phosphorus-containing acid is incorporated in the said reaction product, the acid chloride and acid ester are subsequently neutralised prior to moulding and the product is then moulded.

It has been found that the acid chloride/acid ester mixtures confer distinctive properties, more particularly of a physical nature, on the reaction product which are dependent upon the manner in which each of the components of a mixture is incorporated into that reaction product. For example, modified polymers obtained by employing such mixtures can be suitably milled after a surprisingly long period to form a smooth tacky sheet capable of being easily moulded.

The most effective retardation is obtained when the acid phosphate is added to the hot reaction product of the polyester and isocyanate, e. g. diisocyanate, immediately it is made and the acid chloride added to the cold product by milling some hours afterwards. Modified polymers have been made in this way which are capable of being milled and sheeted after a period of over three weeks.

On the other hand when the acid chloride is added to the hot polyester/diisocyanate reaction product and the acid phosphate milled into the cold product subsequently, the modified polymer obtained retains its ability to mill satisfactorily for only about four days.

However, when the two retarding agents are added simultaneously to the hot reaction product, the modified polymer can be milled successfully after about seven days.

Although the first method produces a modified polymer having a longer period during which it may be satisfactorily milled, polymers obtained by either of the other two methods possess superior physical properties e. g. tensile strength, elongation at break, modulus.

The effect of the alkyl acid phosphate and organic acid chloride can be removed when desired by addition of a base or basic material which may either be organic or inorganic in character. Suitable basic materials which can be used include the following: diphenylamine, paraphenylenediamine, diphenyl-guanidine, guanidine, aniline, piperidine, benzylidine dipiperidine, amino-pyridine, 2-2 dipyridylamine, 2-amino-4-6-dimethyl pyridine, urea, hexamethylene tetramine, hydrazine hydrate, magnesium oxide, calcium hydroxide, and ammonium carbonate. Generally the solid bases are preferred.

The invention is illustrated by the following examples all parts being given by weight:

*Example I*

Two hundred parts of polyethylene glycol adipate wax of molecular weight 1650 and acid value 1.4 mg. of potassium hydroxide per gram of ester, were dehydrated by heating in vacuo at 120° C. for two hours. Thirty-six parts of naphthalene-1:5-diisocyanate were added to the wax with vigorous hand stirring. The temperature, which at first fell, due to addition of the cold isocyanate, finally rose to about 130° C. after about ten minutes mixing. This represents the end of the initial reaction and heating was discontinued. Four parts of 1:4-butylene glycol were added as a cross-linking agent and were well stirred in by hand.

0.8 part of butyl acid phosphate was then incorporated and well mixed by hand-stirring. The product was heated for sixteen hours at 110–115° C., milled on a roller mill and divided into four parts.

One part was milled and gave a somewhat tacky sheet to which 0.5 part of diphenylamine was added. On heating this mixture in a steel mould at 148° C. for 60 minutes a well-moulded product was obtained.

The remaining three parts were stored for a further twenty-four hours and were then milled. The product milled well to give a soft and tacky sheet and to one-third of this 0.5 part of diphenylamine was added and the mixture moulded as before. A good moulding was obtained.

The remaining two parts were stored for a further twenty-four hours and treated as before. Milling was somewhat more difficult but the material still sheeted and to one-half of it 0.5 part of diphenylamine was added and a good moulding again resulted.

After a further twenty-four hours' storage the remaining part was milled and although a satisfactory sheet was obtained the material was less tacky than before and was somewhat more difficult to handle, but after addition of 0.5 part of diphenylamine a good moulding was made on heating in a steel mould for 60 minutes at a temperature of 148° C.

*Example II*

200 parts of polyethylene glycol adipate of similar characteristics to that used in Example I were dehydrated by heating in vacuo at 120° C. for 2 hours, and 36 parts of naphthalene 1:5 diisocyanate then added to the ester with vigorous stirring. The temperature graph followed the course given in Example I and after the ten minutes stirring, 0.4 part of butyl acid phosphate was incorporated and well mixed.

The quantity was reduced in this case, as no cross-linking agent was employed at this stage, but was added later during the milling operations. The cross-linking agent used consisted of an amine or mixture of amines used in an amount greater than that required merely for neutralising the butyl acid phosphate.

After mixing, the reaction product was heated for 16 hours at 110–115° C., milled on a roller mill and divided into four parts. This material, without cross-linking agent, was very much softer and easier to mill than the product described in the previous example. One part was milled and gave a soft and somewhat tacky sheet, to which 0.5 part of diphenylamine and 0.5 part of dipyridylamine were added, and the product moulded by heating in a steel mould at 148° C. for 60 minutes. A well moulded product was obtained which had the following physical characteristics:

| | |
|---|---|
| Tensile strength | lb./sq. in__ 3250 |
| Elongation at break | percent__ 720 |
| Modulus at 100% | lb./sq. in__ 488 |
| Modulus at 300% | lb./sq. in__ 1120 |
| Modulus at 500% | lb./sq. in__ 2260 |

The second part was stored for 24 hours and then milled as before and to the soft tacky sheet 0.5 part of diphenylamine and 0.5 part of amino-pyridine were added. The product moulded as before to give a well-moulded sheet.

The third part was milled after storing for 48 hours, and 0.5 part of dipyridylamine and 0.5 part of amino-pyridine were added. In this case milling was a little more difficult than before, but a satisfactory moulding was obtained.

The fourth part was milled after storing for 72 hours, and 1.0 part of diphenylamine added. With this sample some tendency to crumble on the mill was observed, and although a good moulding was obtained, the sheet was not entirely homogeneous.

*Example III*

Reaction products of polyethylene glycol adipate and naphthalene 1:5 diisocyanate were prepared as described in the two previous examples and to each of these respectively was added 0.2 part, 0.1 part and 0.05 part of ethyl acid phosphate, consisting of a mixture of mono-ethyl and diethyl hydrogen phosphates.

The mixtures were then heated for up to 5 days at 110–115° C. and at the end of this time were still so soft that milling was difficult. They were stored for 7 days at room temperature and could then be milled satisfactorily to form a tacky sheet.

*Example IV*

400 parts of polyethylene glycol adipate wax, of molecular weight 1950 and an acid value of 1.6 mg. of potassium hydroxide per gram of ester were dehydrated by heating in vacuo at 120° C. for 2 hours. 72 parts of naphthalene 1:5 diisocyanate were added to the wax with mechanical stirring. The temperature which at first fell somewhat due to the addition of the cold isocyanate finally rose to about 130° C. At the end of this initial reaction 0.8 part of butyl acid phosphate was added and well stirred in by hand. The product was heated for 17 hours at 110–115° C., and after cooling was then milled and 0.8 part of para nitro-benzoyl chloride added. The material was stored at room temperature in a closed container and the whole milled at various intervals of time and portions taken at each test, a basic material or materials milled in and the sample moulded by heating at 148° C. in a suitable press. The following results were obtained:

| Number of Days storage | Basic materials added | Milling Characteristics | Moulding |
|---|---|---|---|
| 5 | 0.5% diphenylamine+ 0.5% dipyridylamine. | Good | Satisfactory. |
| 9 | do | do | Do. |
| 12 | 0.5% diphenylamine+ 1% o-dichlorobenzidine. | do | Very good. |
| 17 | 0.5% diphenylamine+ 0.5% dipyridylamine. | Satisfactory (20% Hysil added on mill). | Good. |
| 20 | do | Fair | Fair. |
| 23 | Sample crumbled completely on the mill and was unsatisfactory for moulding. | | |

Physical properties of the above sample which had been stored for 12 days were as follows:

Tensile strength (lb./sq. in.) _____ 5130
Elongation at break (percent) _____ 700
Modulus (lb./sq. in.):
    At 200% _____ 273
    At 300% _____ 1090
    At 500% _____ 2990

*Example V*

By the procedure outlined in Example IV a polymer preparation was made from 300 parts of polyethylene glycol adipate wax and 54 parts of naphthalene 1:5 diisocyanate. After preparation 0.6 part each of butyl acid phosphate and para nitrobenzoyl chloride were added. The mixture was heated for 17 hours at 110–115° C., cooled, milled, and stored in a closed container. The batch was milled after various storage periods and the following observations were made:

| Number of Days Storage | Basic material Added | Milling Characteristics | Moulding |
|---|---|---|---|
| 4 | 0.5% diphenylamine+0.5% dipyridylamine. | Good | Good. |
| 7 | do | Fairly Good | Do. |
| 8 | Material tended to crumble on the mill and was unsuitable for moulding. | | |

Physical properties of the above sample which had been stored for 7 days were as follows:

Tensile strength (lb./sq. in.) _____ 4025
Elongation at break (percent) _____ 700
Modulus (lb./sq. in.):
    At 200% _____ 478
    At 300% _____ 1255
    At 500% _____ 1550

*Example VI*

To a batch of polymer prepared as described in the previous example 0.6 part of para nitro-benzoyl chloride was added to the hot reaction mixture which was then heated for 17 hours at 110–115° C., and after cooling 0.6 part of butyl acid phosphate was mixed in on the mill. The material was stored in a closed container. The batch was milled after two storage periods and the following observations were made:

| Number of Days Storage | Basic material Added | Milling Characteristics | Moulding |
|---|---|---|---|
| 2 | 0.5% diphenylamine+ 0.5% dipyridylamine. | Satisfactory | Satisfactory. |
| 5 | Sample tended to crumble on the mill and was unsatisfactory for moulding. | | |

Having now described our invention, what we claim is:

1. A composition for the preparation of synthetic elastomers which comprises a reaction product of a polyester and an organic diisocyanate in admixture with from 0.1 percent to 1.0 percent by weight of an alkyl acid phosphate.

2. A composition according to claim 1, wherein the alkyl acid phosphate is a member of the group consisting of the mono- and di-alkyl esters of orthophosphoric acid.

3. A composition according to claim 2 wherein the said alkyl acid phosphate comprises an alkyl group containing from 2 to 18 carbon atoms.

4. A composition according to claim 3 wherein the alkyl group contains from 3 to 5 carbon atoms.

5. A composition for the preparation of synthetic elastomers which comprises a reaction product of polyethylene glycol adipate and naphthalene 1:5 diisocyanate in the proportion of from 1:1.01 to 1:1.6 in admixture with from 0.1 percent to 1.0 percent by weight of an alkyl acid phosphate, the proportions of the adipate to diisocyanate being molal proportions.

6. A composition according to claim 5 wherein at least a part of the alkyl acid phosphate is soluble in the said reaction product.

7. A composition according to claim 5 wherein a para nitro-benzoyl chloride is also incorporated in the reaction product.

8. A composition according to claim 5 wherein the said reaction product is cross-linked.

9. A process for the preparation of synthetic elastomers which comprises retarding the setting of a reaction product of a polyethylene glycol adipate and naphthalene 1:5 diisocyanate in the molal proportion of from 1:01 to 1:1.6 by incorporating therein from 0.1 percent to 1.0 percent of an acid ester of an alkyl acid phosphate, subsequently neutralizing the said phosphate prior to molding and then molding the product.

10. A process according to claim 9 in which at least a part of the alkyl acid phosphate is soluble in the said reaction product.

11. A process according to claim 9, in which the acid ester is selected from the group consisting of a mono- and di-alkyl ester of orthophosphoric acid.

12. A process according to claim 9 in which a para nitro-benzoyl chloride is also incorporated in the reaction product.

13. A process according to claim 9 in which the alkyl acid phosphate is incorporated in the reaction product at a temperature substantially the same as that at which the reaction occurs and the organic acid chloride is subsequently added when the reaction product has cooled to atmospheric temperature.

14. A process according to claim 9 in which the said alkyl acid phosphate comprises an alkyl group containing from 2 to 18 carbon atoms.

15. A process according to claim 14 in which the alkyl group contains from 3 to 5 carbon atoms.

References Cited in the file of this patent

UNITED STATES PATENTS

| | | |
|---|---|---|
| 2,437,867 | Verbanc | Mar. 16, 1948 |
| 2,692,873 | Langerak et al. | Oct. 26, 1954 |
| 2,728,790 | Sroog | Dec. 27, 1955 |

FOREIGN PATENTS

| | | |
|---|---|---|
| 410,200 | Canada | Jan. 26, 1943 |